United States Patent [19]

Bedard, Jr. et al.

[11] Patent Number: 4,578,994

[45] Date of Patent: Apr. 1, 1986

[54] TEMPERATURE INSENSITIVE PRESSURE JUMP DETECTOR

[75] Inventors: Alfred J. Bedard, Jr., Boulder; Carl P. Ramzy, Denver, both of Colo.

[73] Assignee: The United States of America as represented by the Secretary of Transportation, Washington, D.C.

[21] Appl. No.: 185,466

[22] Filed: Sep. 9, 1980

[51] Int. Cl.⁴ .................. G01W 1/00; F01N 1/14
[52] U.S. Cl. .................... 73/170 R; 73/708; 181/256
[58] Field of Search ........... 73/179, 170 R, 384, 73/386, 387, 708; 181/256, 252

[56] References Cited

U.S. PATENT DOCUMENTS

| | | | |
|---|---|---|---|
| 722,567 | 3/1903 | Crawford | 181/256 |
| 2,159,703 | 5/1939 | Koch | 73/179 |
| 2,240,750 | 5/1941 | Bestelmeyer | 73/179 |
| 2,285,521 | 6/1942 | Kollsman | 73/179 |
| 3,924,464 | 12/1975 | Cummins | 73/170 R |

FOREIGN PATENT DOCUMENTS 164859  6/1921  United Kingdom ................ 73/179

Primary Examiner—Donald O. Woodiel
Attorney, Agent, or Firm—Otto M. Wildensteiner; Harold P. Deeley, Jr.

[57] ABSTRACT

An acoustic capacitor of minimum size and minimum susceptability to temperature-induced internal pressure change. The capacitor comprises an insulated container having an internal member of high heat capacity material surrounded by a porous thermally conductive material; the member acts as a heat sink, slowing the rate of change of pressure due to change in ambient temperature. The internal pressure that is built up due to temperature change is bled off by the same orifice that equilibrates the internal pressure to ambient atmospheric pressure.

6 Claims, 3 Drawing Figures

TEMPERATURE INSENSITIVE PRESSURE JUMP DETECTOR

STATEMENT OF GOVERNMENT INTEREST

The present invention was made by employees of the U.S. Government and may be made or used by or on behalf of the Government without the payment of any royalties thereon or therefor.

BACKGROUND

The present invention is an acoustic capacitor that is intended for use in a "pressure jump" detector. A "pressure jump" is the sudden rise in atmospheric pressure that accompanies the outflow from a thunderstorm; these pressure jumps have been found to indicate the wind shears accompanying such storms, hence measurement of them is useful around airports which are subject to such storms. (For additional material on pressure jumps in general see "The Design and Use of Sensitive Pressure-Jump Sensors to Detect Thunderstorm Gust Fronts. Part 1: Pressure-Jump Detector Design" by Bedard and Meade, Journal of Applied Meteorology, Vol. 16, No. 10, October 1977.) Pressure jumps are of the order of 0.5 to 2 millibars and occur over time spans of 2 to 5 minutes. Measuring them must take into account the instantaneous atmospheric pressure, since a pressure jump can start from any level of pressure. Therefore the reference pressure against which the pressure jump is measured must be the atmospheric pressure which existed just prior to the jump, rather than a vacuum or other fixed pressure.

Early pressure jump detectors used a 50-100 gallon container for the reference pressure; sometimes this was buried underground for thermal stability. Obviously a large container such as that was difficult to conveniently install in most locations, hence a smaller reference pressure container was designed. This container had a volume of about 0.25 liters and was filled with a porous thermally conductive material such as steel wool. The porous thermally conductive material helped somewhat to suppress the short-period thermally induced pressure changes because of its increased heat capacity.

While the steel wool-filled reference volume worked reasonably well, it suffered from problems with variation in the pre-set trigger point. That is, the minimum level of pressure jump which would activate the detector would vary with atmospheric (and hence detector) temperature. Thus it was necessary to come up with a design which was small and easily mounted, but which did not have the objectionable temperature dependence of the prior models.

All reference pressure containers have a small capillary leak which allows the internal pressure to follow the long-term barometric pressure fluctuations; increasing the size of this capillary would reduce the thermally-induced pressure fluctuations, but it would also reduce the sensitivity of the detector to pressure jumps.

OBJECTS OF THE INVENTION

Accordingly, it is an object of the present invention to provide an acoustic capacitor of relatively small size.

It is a further object to provide such a capacitor having a reduced temperature sensitivity.

SUMMARY

Briefly, the present invention is a reference volume for a pressure jump detector wherein the temperature effects on the reference pressure are reduced. This is done by putting a high heat capacity member inside the reference volume to act as a heat sink, and surrounding it with a porous thermally conductive material which keeps the member at the temperature of the air within the reference volume.

DESCRIPTION OF THE PREFERRED EMBODIMENT

Figure 1:
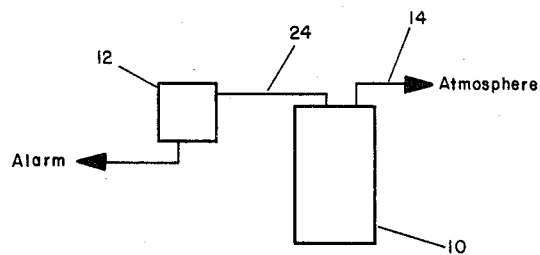
FIG. 1 shows a schematic drawing of a pressure jump detector.

FIG. 1 is a schematic of a pressure jump detector. The detector comprises a relatively small reference volume container 10, a differential pressure gauge 12, and a remote alarm not shown. There is a capillary leak 14 in container 10 which allows its internal pressure to follow the normal fluctuations in barometric pressure without triggering the alarm.

Figure 2:
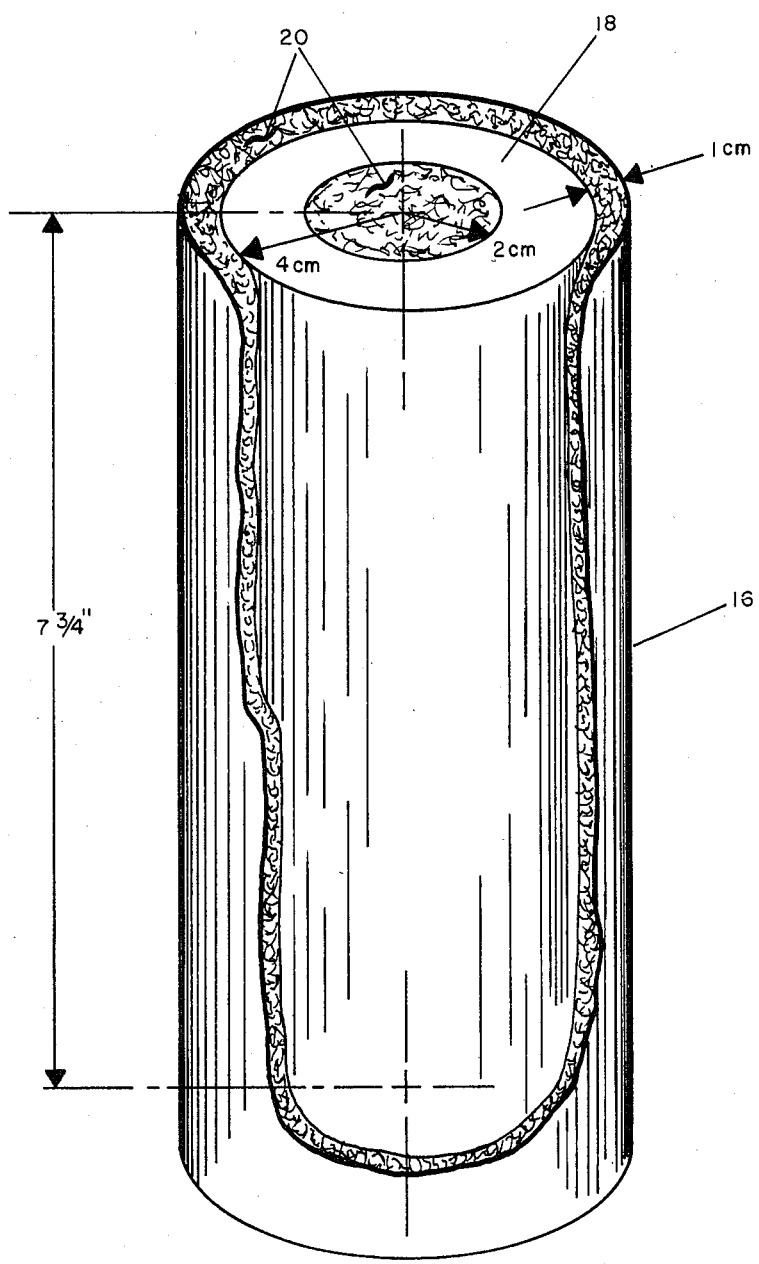
FIG. 2 is a sectional perspective view of the reference volume of the present invention.

FIG. 2 shows the reference volume container in sectional perspective. It comprises a container 16 with insulation on its outer surface having an internal annular member 18 of material of high heat capacity on its axis, with a porous material of good thermal conductivity 20 between the annular member and the container walls and inside the member. There is also a 1 cm layer of this material between the ends of insert 18 and the top and bottom of container 16. Porous material 20 can be steel wool or any other material having like thermal properties. Outer container 16 has a volume of 2 liters; annular member 18 has a volume of approximately 743 cubic centimeters, leaving a free volume (ignoring the volume occupied by the steel wool) of 1257 cubic centimeters. This free volume is the source of the barometric pressure against which the pressure jump is measured.

Annular member 18 on the axis of container 16 is made of any material having a high heat capacity; copper would obviously be a good material, but aluminum works equally well where weight is a problem. Its only function is to act as a heat sink, as will be explained later.

Tube 24 (FIG. 1) leads from reference container 10 to differential pressure gauge 12. Differential pressure gauge 12 measures the difference between the pressure in reference container 10 and barometric pressure, and activates an alarm (not shown) when the difference exceeds a pre-set level (the "trigger point"), as is well known in the art.

There is also a capillary leak 14 in reference container 10. This is necessary because barometric pressure fluctuates constantly, and if the pressure within reference container 10 were not to follow these fluctuations a false alarm would be registered every time the pressure differential exceeded the trigger point. The flow resistance of capillary leak 14 has a substantial bearing on the performance of the detector as a whole. If the resistance were low, the internal pressure would follow barometric pressure fluctuations very quickly and give a reference pressure that was very close to that which existed immediately prior to a pressure jump; however, this same low flow resistance would also allow the internal pressure to follow the pressure jump and would tend to cover up a small jump. Conversely, a high resistance would make the detector very sensitive to small pressure jumps, but the reduced ability to follow large, slow barometric fluctuations would result in many false alarms. Thus the optimum flow resistance is a compromise between sensitivity to pressure jumps and ability to follow normal barometric pressure fluctuation. The prototype used a 28 gauge hypodermic needle 2 inches long as its capillary leak; this had a flow resistance of about 750,000 acoustic ohms (a pressure change of 1 microbar is produced by a flow of 1 cc/second through 1 ohm). The final design used a flow resistor made by Corning Glass Works, calibrated standard leak catalog number 193250 30SCC having a flow resistance of approximately 120,000 ohms. The inlet to the leak must have some sort of filter on it to keep it from being plugged by dust, insects, etc.; it should also have some means of reducing wind noise. A suitable filter is a porous cylinder covering the inlet made of sub-millimeter size hydrophobic balls which are fused together during manufacture. This has a low flow resistance and reduces wind pressure by integrating the total pressure field over the surface of the cylinder, which is approximately 2 inches long, $\frac{3}{4}$ inches in diameter, and has $\frac{1}{8}$ inch thick walls.

Figure 3:
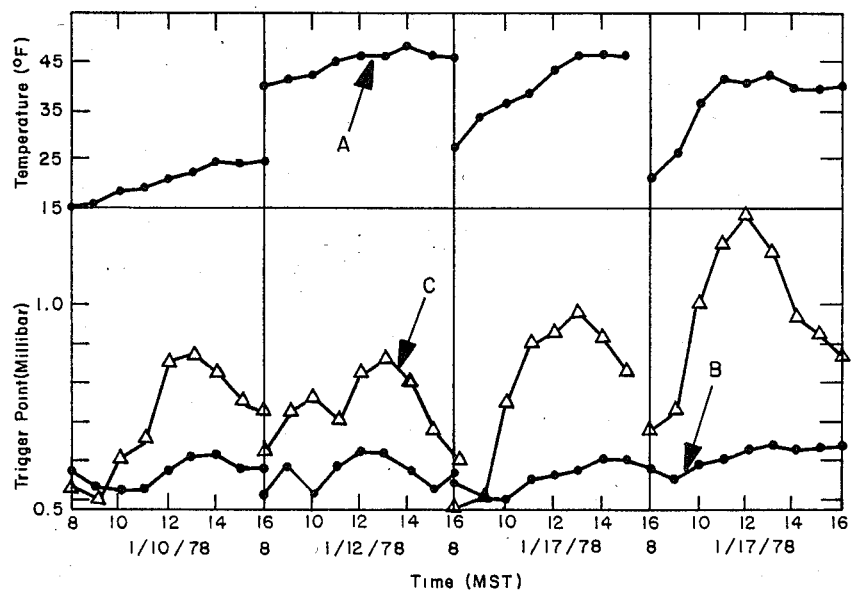
FIG. 3 is a set of graphs showing the variation in trigger points with temperature of the reference volume of the present invention and prior art reference volumes.

FIG. 3 shows the effect of ambient temperature (curve A) on the trigger point (the pressure differential at differential pressure gauge 12 required to activate the alarm) of a detector with a heat sink (curve B) and one without a heat sink (curve C). As ambient temperature increased, the pressure rise due to temperature in the detector of curve C was greater than could bleed off through the capillary leak; this resulted in the rise in trigger point as shown. Since the rise in trigger point means that a greater pressure jump was necessary to activate the alarm, the overall effect was to cause the detector to miss lower pressure jumps that it was designed to respond to. Note that as ambient temperature levelled off the pressure in the detector of curve C was able to bleed off and the trigger point decreased. In the detector of curve B the trigger point remained nearly constant as ambient temperature rose, the result of having a heat sink in the reference volume.

Operation of the device is as follows, assuming that the reference pressure equals ambient barometric pressure. As barometric pressure changes over the course of several hours, the capillary leak allows the pressure within reference container 10 to follow it by allowing air to flow into or out of container 10. If ambient temperature increases, the heat which gets into container 10 is conducted to annular member 18 by porous material 20. Member 18 then absorbs this heat rather than allowing the air within container 10 to absorb the heat, which would result in a rise in temperature and hence pressure within container 10. The pressure in container 10 thus is always very close to ambient regardless of what the temperature is. As the temperature drops, member 18 gradually gives up its heat; this release of heat, and consequent tendency to keep the pressure up, is slow enough to allow the pressure to be bled off through capillary leak 14. Once again the pressure in container 10 remains very close to ambient pressure. When a pressure jump occurs, the sudden rise in barometric pressure is much too fast to be bled into container 10 through capillary 14; it thus shows as a pressure differential at differential pressure gauge 12, and if it is above the trigger point it activates the alarm.

A volume of 2 liters was chosen because it represents the best compromise between size and practicality. A smaller size would require a much smaller capillary leak (of the order of 1 million acoustic ohms) which would make the system much more sensitive to leaks and would make the capillary much more sensitive to plugging. A larger size would obviously make the system much bigger and would present the same installation problems that the present volume was designed to solve.

The shape of the reference volume container should ideally be spherical or a cylinder whose diameter is the same as its height; each of these has a long thermal path of heat getting into the air, hence each has a long thermal time constant. In the present case the cylinder is somewhat longer than ideal; this is because the reference volume container was designed to fit into an existing box, and the reduction in thermal time constant was not very great.

What is claimed is:

1. An acoustic capacitor comprising a relatively small container, an internal heat sink member of high heat capacity inside said container, a layer of porous thermally conductive material between said internal member and said container, and a single capillary leak in said container.

2. An acoustic capacitor as in claim 1 having a layer of thermal insulation on the outside of said container.

3. An acoustic capacitor as in claim 2 wherein said internal member is in the shape of an annular cylinder.

4. An acoustic capacitor as in claim 3 wherein said annular cylinder contains said porous thermally conductive material within its core.

5. An acoustic capacitor as in claim 4 wherein said porous thermally conductive material is steel wool.

6. An acoustic capacitor as in claim 5 wherein the volume of said container is of the order of 2 liters.

* * * * *